United States Patent
Terry, Jr.

[15] 3,681,674
[45] Aug. 1, 1972

[54] D.C. TO D.C. CONVERTER
[72] Inventor: Reese S. Terry, Jr., Miami, Fla.
[73] Assignee: Cordis Corporation, Miami, Fla.
[22] Filed: Dec. 9, 1971
[21] Appl. No.: 206,459

[52] U.S. Cl. .................321/2, 307/251, 307/304, 331/111, 331/112
[51] Int. Cl. .............................................H02m 3/22
[58] Field of Search.....307/251, 304; 321/2; 330/35; 332/52 T; 331/111, 112, 116, 117

[56] References Cited

UNITED STATES PATENTS 2,854,614  9/1958  Light ..............................321/2
2,881,380  4/1959  Kruger............................321/2
3,491,281  1/1970  Penn.........................331/112 X

OTHER PUBLICATIONS

" Fet Converter Is Self-Oscillating" , Electronics, Dec. 23, 1968, pp. 62- 63

*Primary Examiner*—William M. Shoop, Jr.
*Attorney*—Herbert W. Kenway et al.

[57] ABSTRACT

In the d.c. to d.c. converter disclosed herein, a junction field-effect transistor is employed in a self-starting resonant oscillator circuit in which a single transformer secondary winding functions as both feedback winding and output winding. The gate-source junction of the transistor provides rectification in the output circuit.

8 Claims, 1 Drawing Figure

PATENTED AUG 1 1972  3,681,674
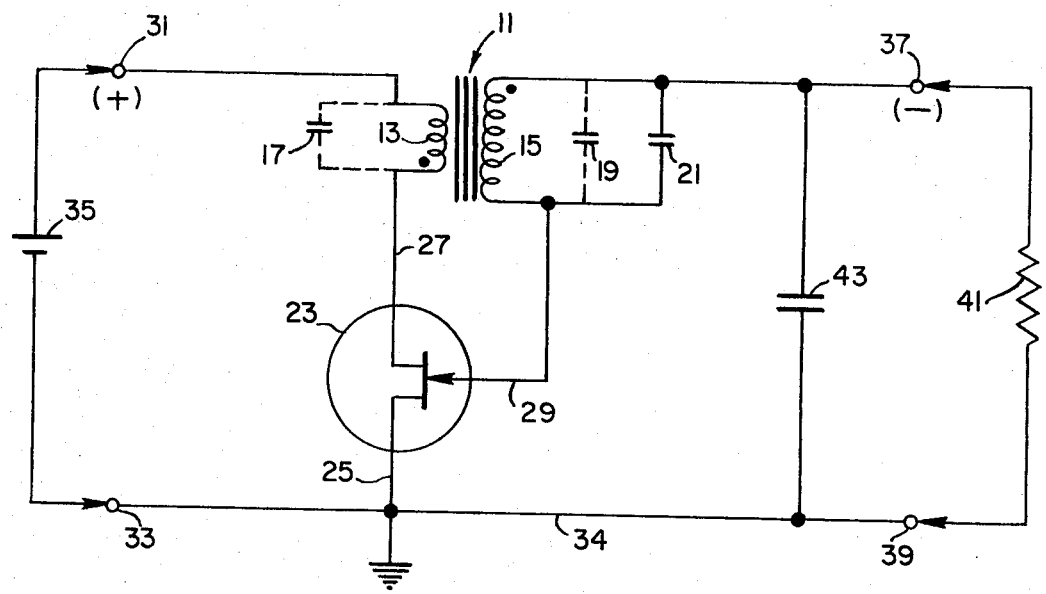

D.C. TO D.C. CONVERTER

BACKGROUND OF THE INVENTION

The present invention relates to d.c. to d.c. converters and more particularly to such a converter which is efficient at low power levels and voltages.

While various d.c. powered inverters and converters have been devised heretofore, these prior art devices have not ordinarily been suited for operation at very low power levels, e.g., a milliwatt and below. Rather, the operation of prior art converters has typically been such that efficiency was greater at higher power levels than at low power levels, particularly with the common square-wave or saturating type inverter. Also, a problem with many types of prior art inverter circuits was that they were not self-starting, that is, special circuitry had to be provided to initiate oscillation or, in some cases, to temporarily disconnect the load during starting.

In certain applications, however, the ability to efficiently convert d.c. power at one low voltage level to a different voltage level is desirable, even though the power levels may be quite low. One particular example is in the construction of implantable cardiac pacers. As is known, both the efficiency and reliability of an electrochemical power source are improved if the number of cells employed is reduced. In other words, a single cell of a given size is more efficient than a multiple cell unit of the same physical size or mass. Likewise, the single cell is much less likely to fail than the multiple cell. Heretofore, however, it has been necessary to employ a multiple-cell power pack for implantable pacers in order to provide the voltages required by the typical pacer circuitry. Furthermore, certain power sources now under development for use in implantable cardiac pacers are adapted to provide current at relatively low voltages. For example, the so-called atomic battery typically provides a source potential of about half a volt. In contrast, present cardiac pacer designs require supply potentials in the order of 3 to 6 volts or even higher.

While the use of a power converter of any sort necessarily entails some loss, the availability of a reasonable conversion efficiency at extremely low power levels may make it advantageous to use a low voltage source to power higher voltage circuits due to the increased efficiency and reliability obtainable from the source itself since a single cell may be used instead of a multiple cell, thereby increasing the ratio of active material to package weight and by decreasing the likelihood of statistical failure.

Among the several objects of the present invention may be noted the provision of a d.c. to d.c. converter which provides reasonable efficiency at quite low power levels; the provision of such a converter which will operate with very low supply voltages; the provision of such a converter which is self-starting; the provision of such a converter which is highly reliable; the provision of such a converter which requires very few components and which is of relatively simple and inexpensive construction. Other objects and features will be in part apparent and in part pointed out hereinafter.

SUMMARY OF THE INVENTION

Briefly, a d.c. to d.c. converter according to the present invention is adapted for coupling a d.c. source providing current at one voltage to a load adapted to utilize direct current at a different voltage. The inverter employs a resonant transformer having an input winding and an output winding, these windings being insulated from each other. The converter also employs a junction field-effect transistor having a pair of terminals with a resistive channel circuit therebetween and a gate terminal, there being a rectifying semiconductor junction between the gate terminal and the channel circuit. The conductivity of the channel circuit is variable as a function of the voltage applied to the gate terminal with respect to the channel circuit. The primary winding of the transformer is connected in series with the channel circuit across the source while one end of the secondary winding is connected to the gate terminal, substantially directly. The windings are polarized so that regenerative feedback is provided. The other end of the secondary winding is connected to one side of the output or load circuit. The load circuit includes a capacitor which bridges the output circuit, the other side of the output circuit being connected to one side of the source. Accordingly, the regenerative feedback thereby provided induces oscillations in the transformer. The oscillatory current induced in the secondary winding is rectified by the gate-source junction of the transistor thereby to develop a unidirectional current in the output circuit.

BRIEF DESCRIPTION OF THE DRAWING

The single FIGURE is a schematic circuit diagram of a d.c. to d.c. converter according to the present invention.

DESCRIPTION OF THE PREFERRED EMBODIMENT

Referring now to the drawing, there is indicated at 11 a resonant transformer having a primary or input winding 13 and a secondary or output winding 15, these windings being insulated from each other. Typically, the distributive capacitances of the windings 13 and 15, shown in broken lines and indicated at 17 and 19 respectively, will be sufficient to render the transformer 11 suitably resonant for the purposes of the present invention. However, if needed, an additional tuning capacitance may be added to one or to both of the windings, e.g., as indicated at 21 in parallel with the secondary winding 15.

Resonant oscillations in transformer 11, are driven by means of a junction field-effect transistor 23. Transistor 23 includes a source terminal 25 and a drain terminal 27, there being a resistive channel circuit extending therebetween. Transistor 23 also includes a gate terminal 29. As is understood with regard to this type of transistor, there is a semiconductor rectifying junction between the gate terminal 29 and the resistive channel circuit. This junction is referred to as the gate-source junction. As is likewise understood, conduction through the channel circuit is variable as a function of the voltage or potential applied to the terminal 29 with respect to the terminal 25. Preferably, transistor 23 is of the depletion mode type so that some conduction will exist in the channel circuit when zero potential exists between the gate terminal 29 and the source terminal 25. In the embodiment illustrated, transistor 23 is of the N-channel type but it should be understood that the opposite or P-conductivity type may be used with a corresponding reversal of polarities.

As indicated in the drawing, the primary winding 13 and the channel circuit of transistor 23 are connected in series across a pair of d.c. input terminals 31 and 33. Terminals 31 and 33 are adapted to receive d.c. power from a low voltage source, e.g., the single electrochemical cell indicated at 35. In the embodiment illustrated, the lead 34 connected to terminal 33 may be considered to be ground potential and the source 35 provides a positive potential with respect thereto.

One end of the secondary winding 15 is connected essentially directly to the gate terminal 29 while the other end of this winding is connected to an output terminal 37 which constitutes one side of the load circuit. The other side of the load circuit is constituted by a terminal 39 which is connected to one side of the source circuit, i.e., to the terminal 33 through the ground lead 34 in the embodiment illustrated. A suitable resistive load is indicated at 41 in the drawing. The output circuit is shunted by a filter capacitor 43 which, as is explained in greater detail hereinafter, performs the functions of converting unidirectional current pulses to direct current and of providing a d.c. reference potential for the feedback circuit operation. While the capacitor 43 is shown in the embodiment illustrated as a component of the converter itself, it should be understood that the load with which the converter is to be used may possess sufficient shunt capacitance so that no separate capacitor in the converter is needed.

As indicated by the conventional dot notation in the drawing, the polarities of the windings of 13 and 15 are such that positive or regenerative feedback is supplied around the transistor 23, that is, the gate terminal 29 is driven to a more positive potential as the drain terminal 27 is pulled to a more negative potential by conduction through the channel circuit.

Assuming that no voltage exists across the load 41 and the filter capacitor 43 when the source 35 is initially connected, some nominal amount of conduction will exist in the transistor channel. Accordingly, gain will be present so that the positive feedback provided will cause any initial perturbation to grow into a sustained oscillation. As oscillation builds up, the rectifying action provided by the semiconductor junction between the gate terminal 29 and the channel circuit will cause the oscillatory feedback signal to be rectified. Accordingly, the output terminal 37 will be driven, by this rectified current component, to a potential which is negative with respect to ground. When equilibrium is reached, i.e., sustained oscillation, the upper end of winding 15 will be maintained at a negative d.c. potential such that only the most positive-going excursions of the opposite end of the winding will forward bias the base-source junction. However, since these pulses of current will be in phase with the conduction through the primary winding 13, the oscillations will be sustained. In this state, the transistor 23 may thus be considered to be in class C operation. Furthermore, since the gate-source junction provides rectification of the feedback signal, no separate rectifier is needed to obtain a unidirectional output current. Thus, a very simple construction is provided in which only a resonant transformer and a junction field-effect transistor are needed, together with a filter capacitor if the load circuit itself is not sufficiently capacitive.

In a particular embodiment of this inverter, the transformer 11 comprised a Ferroxcube pot core model 1408 with a primary winding of 18 turns of No. 30 wire and a secondary winding of 380 turns of Number 38 wire. The transistor 23 was a type 2N4858. The transformer thus constructed was resonant with a Q of 18 without any separate resonating capacitor. With an input voltage of 0.4 volts, this circuit would develop about 7 volts across a 180 K ohms load, thereby providing a measured efficiency of better than 55 percent. A separate filter capacitor was provided.

Since the converter draws a pulsating current from the source, it may in some circumstances be desirable to shunt the source with a filter capacitor if the source exhibits a relatively high resistance. Similarly, if improved output regulation is needed, a Zener diode may be placed across the output circuit of the converter to lower its effective source impedance.

In view of the foregoing, it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. A d.c. to d.c. converter for coupling a d.c. source providing current at one voltage to a load adapted to utilize unidirectional current at a different voltage, said converter comprising:
   a resonant transformer having an input winding and an output winding, said windings being insulated from each other;
   a junction field-effect transistor having a pair of terminals with a substantially resistive channel circuit therebetween and a gate terminal, there being a rectifying semiconductor junction between said gate terminal and said channel circuit, the conductivity of said channel circuit being variable as a function of the voltage applied to said gate terminal with respect to said channel circuit;
   means connecting said primary winding in series with said channel circuit for connection across said source;
   means substantially directly connecting one end of said secondary winding to said gate terminal;
   means for connecting the other end of said secondary winding to one side of said load circuit; and
   means for connecting the other side of said load circuit to one side of said source,
   whereby said transformer is driven into resonant oscillation by said transistor and rectification, by said junction, of the oscillatory signal induced in said output winding generates a unidirectional current in said load circuit.

2. A converter as set forth in claim 1 including a tuning capacitor shunting at least one of said windings.

3. A converter as set forth in claim 1 including a filter capacitor shunting said load circuit.

4. A converter as set forth in claim 1 in which said transistor is of the depletion mode type.

5. A converter as set forth in claim 1 wherein said other side of the load circuit is connected to the side of said current source which is connected to said transistor channel circuit.

6. A d.c. to d.c. converter for coupling a d.c. source providing current at one voltage to a load adapted to utilize direct current at a different voltage, said converter comprising:
- a resonant transformer having an input winding and an output winding, said windings being insulated from each other;
- a junction field-effect transistor of the depletion mode type having source and drain terminals with a resistive channel circuit extending therebetween and a gate terminal for controlling conduction through said channel circuit, there being a rectifying semiconductor junction between said gate terminal and said channel circuit;
- means for connecting said source terminal to one side of said current source;
- means for connecting one end of said input winding to said drain terminal and the other end to the other side of said current source;
- a filter capacitor one end of which is connected to said one side of said current source;
- means connecting one side of said output winding to the other end of said capacitor; and
- means connecting the other side of said output winding to said gate terminal, the ends of said input and output windings connected to said transistor being oppositely polarized thereby to provide positive feedback around said transistor,
- whereby said transformer is driven into resonant oscillation by said transistor and rectification, by said junction, of the oscillatory signal induced in said output winding generates at said other end of said filter capacitor a d.c. voltage of polarity opposite to that applied to said input winding by said source, with respect to the potential at said source terminal.

7. A converter as set forth in claim 6 including a tuning capacitor shunting one of said windings.

8. A d.c. to d.c. converter for coupling a d.c. source providing a positive potential with respect to ground to a load adapted to utilize direct current at a higher voltage, said converter comprising:
- a resonant transformer having an input winding and an output winding, said windings being insulated from each other, said output winding having a substantially greater number of turns than said input winding;
- a junction field-effect transistor of the depletion mode type having source and drain terminals with an N-type resistive channel circuit extending therebetween and a gate terminal for controlling conduction through said channel circuit, there being a rectifying P-N semiconductor junction between said gate terminal and said channel circuit;
- means for connecting said source terminal to ground;
- means for connecting one end of said input winding to said drain terminal and the other end to said positive source potential;
- a filter capacitor one end of which is connected to ground;
- means connecting one side of said output winding to the other end of said capacitor; and
- means connecting the other side of said output winding directly to said gate terminal, the ends of said input and output windings connected to said transistor being oppositely polarized thereby to provide positive feedback around said transistor,
- whereby said transformer is driven into resonant oscillation by said transistor and rectification, by said semiconductor junction, of the oscillatory signal induced in said output winding generates a negative voltage of magnitude greater than said positive voltage at said other end of the said filter capacitor.

* * * * *